(12) United States Patent
Loe

(10) Patent No.: US 9,113,619 B2
(45) Date of Patent: Aug. 25, 2015

(54) VERSATILE FISHING STRIKE INDICATOR

(75) Inventor: Thomas Edward Loe, Mammoth Lakes, CA (US)

(73) Assignee: Thomas Edward Loe, Mammoth Lakes, CA (US)

( * ) Notice: Subject to any disclaimer, the term of this patent is extended or adjusted under 35 U.S.C. 154(b) by 827 days.

(21) Appl. No.: 13/569,657

(22) Filed: Aug. 8, 2012

(65) Prior Publication Data

US 2012/0304525 A1 Dec. 6, 2012

Related U.S. Application Data

(63) Continuation of application No. 12/632,380, filed on Dec. 7, 2009, now Pat. No. 8,266,837.

(51) Int. Cl.
*A01K 93/00* (2006.01)
*A01K 93/02* (2006.01)
(52) U.S. Cl.
CPC .................. *A01K 93/00* (2013.01); *A01K 93/02* (2013.01)

(58) Field of Classification Search
USPC .............. 43/43.1, 43.12, 43.14, 44.81, 44.83, 43/44.86, 44.92, 44.93, 44.94, 44.95
See application file for complete search history.

(56) References Cited

U.S. PATENT DOCUMENTS

| | | | | | |
|---|---|---|---|---|---|
| 2,726,474 | A | * | 12/1955 | Soskice | 43/43.14 |
| 2,729,014 | A | * | 1/1956 | Johnson | 43/42.49 |
| 2,793,447 | A | * | 5/1957 | King | 43/43.14 |
| 2,803,082 | A | * | 8/1957 | Claybrook | 43/43.14 |
| 2,808,677 | A | * | 10/1957 | Dusablon et al. | 43/42.22 |
| 3,698,120 | A | * | 10/1972 | Grogan | 43/43.14 |
| 3,747,257 | A | * | 7/1973 | Olsen | 43/43.14 |
| 3,757,453 | A | * | 9/1973 | Therres | 43/43.14 |
| 3,990,172 | A | * | 11/1976 | Haquist | 43/43.14 |
| 4,257,182 | A | * | 3/1981 | Thom | 43/42.06 |

* cited by examiner

*Primary Examiner* — David Parsley
(74) *Attorney, Agent, or Firm* — John L. Rogitz

(57) ABSTRACT

A strike indicator has a hollow plastic spherical body with an opening through which water can flow into the body to weight the body for spin cast fishing and out of which water can be removed from the body for fly cast fishing. An easily manipulable thumbscrew can engage the opening to selectively block the opening while trapping a fishing line between a grommet on the thumbscrew and the spherical body to hold the strike indicator onto the fishing line.

12 Claims, 2 Drawing Sheets

VERSATILE FISHING STRIKE INDICATOR

FIELD OF THE INVENTION

The present application is directed to strike indicators for fishing.

BACKGROUND OF THE INVENTION

Strike indicators, also referred to as strike detectors or "bobbers", are used to indicate when a fish is striking an intended target such as bait, a lure, or a fly. Strike indicators are attached to the fishing line and normally float, and when a fish strikes the target the strike indicator partially or completely submerges, usually bobbing up and down, giving a visual indication of the strike.

As understood herein, attaching the strike indicator to the fishing line ideally should be easy and should not require a tool or excessive manual dexterity, to facilitate use by an inexperienced fisherman or a person fishing under potentially trying circumstances of, e.g., dim light, encumbered surroundings, etc. Furthermore, present principles recognize that the weight of the strike indicator might advantageously be lighter for some types of fishing than for other types of fishing.

SUMMARY OF THE INVENTION

A fishing strike indicator includes a spherical hollow body defining a spherical interior void and an outer surface. A passageway for fluid communication is formed into the interior void. Also, a boss is on the outer surface of the body and the boss defines at least part of the passageway for fluid communication. A screw defines a threaded shank around which a grommet is disposed. The shank threadably engages the boss to selectively block and unblock the passageway for fluid communication.

As set forth further below, in example embodiments the screw further defines a collar that in turn defines an inwardly-facing surface describing a plane and an outwardly-facing surface parallel to the plane of the inwardly-facing surface. The grommet is disposed against the inwardly-facing surface of the collar of the screw. With this structure, the screw is rotatable between a disengaged configuration, in which the passageway is open to permit fluid communication into and out of the interior void of the body, and a tightly engaged configuration, wherein the passageway is blocked and the grommet contacts the boss to trap a fishing line therebetween when the fishing line is disposed between the grommet and the boss. To facilitate grasping by a person, the screw also defines a manipulable flange extending away from the outwardly-facing surface of the collar and defining a plane perpendicular to the plane defined by the inwardly-facing surface of the collar.

In example implementations the body is made of polypropylene and the grommet is made of resilient plastic or rubber. The boss may be internally threaded at least around the part of the passageway defined by the boss. The flange can be generally heart-shaped.

In another aspect, a fishing appliance has a hollow body member, a passageway for fluid communication formed through the body member to permit fluid to flow in and out of the body member through the passageway, and a manually manipulable blocking element configured for selectively blocking the passageway and to trap a fishing line between the body member and the blocking element when the passageway is blocked by the blocking element. The blocking element can be positioned to permit water to enter the body member to weight the body member for spin fishing. The element can then be positionable to trap a fishing line between the blocking element and the body member and to substantially prevent water from exiting the body member. Further, the blocking element is manipulable to unblock the passageway to permit the body member to be substantially emptied of water for fly fishing. The blocking element is positionable to block the passageway to prevent water from entering the substantially empty body member and to trap a fishing line between the blocking element and the body member.

In yet another aspect, a method includes establishing fluid communication between a hollow interior of a generally spherical buoyant body member and a source of water to dispose water in the interior to establish a weighted body. The method includes preventing egress of the water from the interior while trapping a fishing line against the body member, and spin casting for fish using the line with weighted body. The weighted body floats on water to give an indication of a fish striking a target on the line.

The method may then further includes substantially emptying the body member of water to establish an unweighted body, preventing entry of water into the interior while trapping a fishing line against the unweighted body, and fly casting for fish using the line with unweighted body. The unweighted body floats on water to give an indication of a fish striking a target on the line.

DETAILED DESCRIPTION OF THE PREFERRED EMBODIMENT

Figure 1:
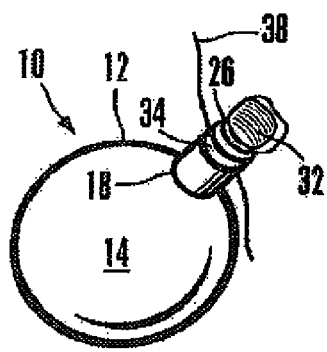
FIG. 1 is a perspective view of an example strike indicator in accordance with present principles.
Figure 2:
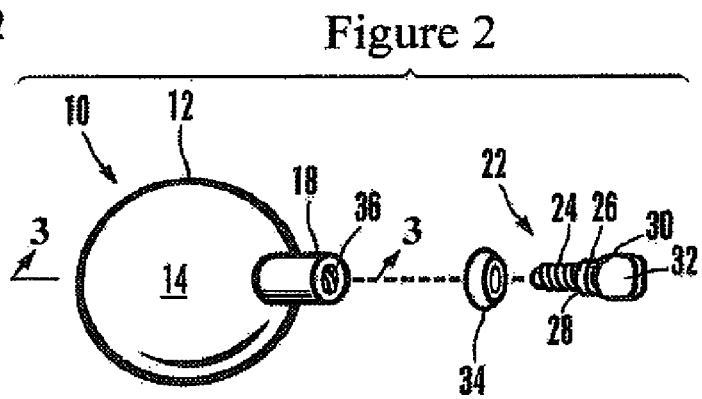
FIG. 2 is an exploded perspective view of the strike indicator shown in FIG. 1.
Figure 3:
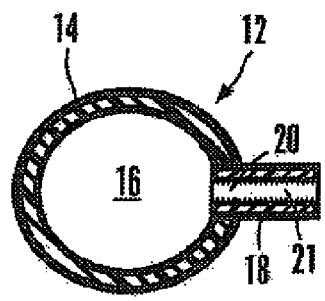
FIG. 3 is a cross-sectional view of the body member as seen along the line 3-3 in FIG. 2.

Referring initially to FIGS. 1-3, a fishing strike indicator, generally designated 10, includes a hollow preferably buoyant body member 12. The body member 12 includes a spherical hollow body 14 defining spherical interior void 16 (FIG. 3). The body member 12 also includes a hollow cylindrical blocking element receptacle 18 extending radially away from the outer surface of the body 14. In one example implementation the receptacle 18 is internally threaded to define a boss.

The body member 12 preferably can be made of a unitary piece of material, such as polypropylene, that is buoyant in fresh water, so that the body 12 member floats even when weighted with water in its interior void as more fully described below. In other words, the body 12 member preferably is buoyant owing not just to its hollow interior but also owing to the material from which the body 12 member is made.

The diameter of the body 14 may range from, e.g., half a centimeter or so to many centimeters, e.g., ten centimeters, and in some example implementations is one to three centimeters in diameter. The thickness of the spherical wall of the body 14 may be, e.g., a tenth of a millimeter or so or other appropriate thickness for, e.g., facilitating making the body member by injection molding.

As shown best in FIG. 3, a passageway 20 for fluid communication is established between the void 16 of the spherical body 14 and the exterior of the body member 12. The passageway 20 may be oriented along a radial defined by the spherical body 14 as shown. At least a portion 21 of the passageway 20 can be established by the receptacle 18 as shown in FIG. 3. it will readily be appreciated that when the passageway 20 is not blocked, water can flow into and out of the void 16, whereas when the passageway 20 is blocked, water inside the void 16 cannot egress nor can water outside the body member 12 enter the void 16.

To selectively block and unblock the passageway 20 while also serving to trap a fishing line such that the body member 12 is held onto the fishing line, a blocking element is provided. The blocking element may be solid elongated cylindrical plug that sides within the passageway 20 in a tight interference fit therewith. In the example shown in FIGS. 1 and 2, however, the blocking element is established by a thumbscrew 22 which includes an elongated threaded preferably solid cylindrical shank 24 that threadably engages the interior cylindrical surface of the receptacle 18, which itself may be threaded complementarily to the shank 24 as intimated above.

The thumbscrew 22 also includes, on a proximal end of the shank 24 relative to the body member 12, a collar 26. As perhaps best shown in FIG. 2, the collar 26 defines an inwardly-facing surface 28 defining a plane and an outwardly-facing surface 30 parallel to the plane defined by the inwardly-facing surface 28, with the parallel planes of the collar surfaces 28, 30 being orthogonal to the long axis of the shank 24.

Completing the description of the thumbscrew 22, a manipulable preferably flat flange 32 extends away from the outwardly-facing surface 30 of the collar 26. As shown in the example embodiment of FIGS. 1 and 2, the flange 32 defines a plane that is perpendicular to the plane defined by the inwardly-facing surface 28 of the collar 26. The flange 32 may be heart-shaped as shown to facilitate grasping of the flange 32 between a person's fingers to promote rotational manipulation of the thumbscrew 22. In one example implementation the shank 24, collar 26, and flange 32 are made unitarily with each other by injection molding.

As contemplated by the example embodiment of FIGS. 1 and 2, a sealing element such as a flat washer or, as shown, a toroidal-shaped resilient rubber or plastic grommet 34, may surround the shank 24 and abut the inwardly-facing surface 28 of the collar 26. It may now be appreciated that the thumbscrew 22 can be rotated to a disengaged configuration, in which the passageway 20 is open to permit fluid communication into and out of the interior void 16 of the body 14. It may be further appreciated that the thumbscrew 22 can be positioned in the receptacle 18 and rotated to a tightly engaged configuration (FIG. 1), in which the passageway 20 is blocked and the grommet 34 is sandwiched between the outwardly-facing circular lip 36 (FIG. 2) of the receptacle 18 and the inwardly-facing surface 28 of the collar 26.

Furthermore, as best appreciated in reference to FIG. 1, a fishing line 38 can be disposed around the shank 24 prior to tightening the thumbscrew 22 into the receptacle 18. Then, when the thumbscrew 22 is moved to the tightly engaged configuration, the fishing line 38 is trapped between the grommet 34 and the lip 36 of the receptacle 18.

Figure 4:
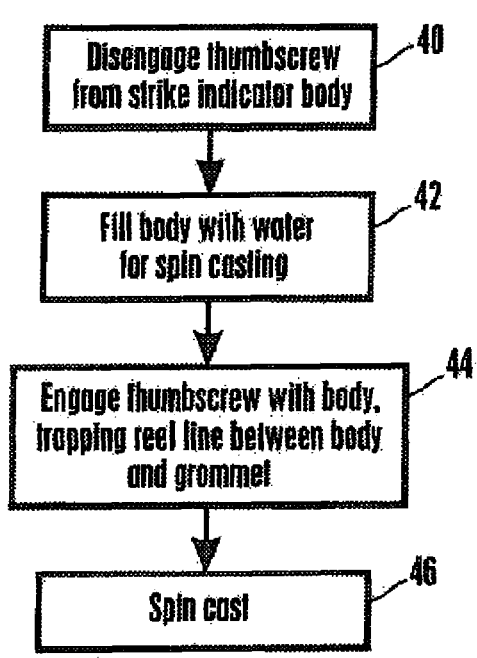
FIG. 4 is a flow chart illustrating the steps for using the strike indicator for spin fishing.
Figure 5:
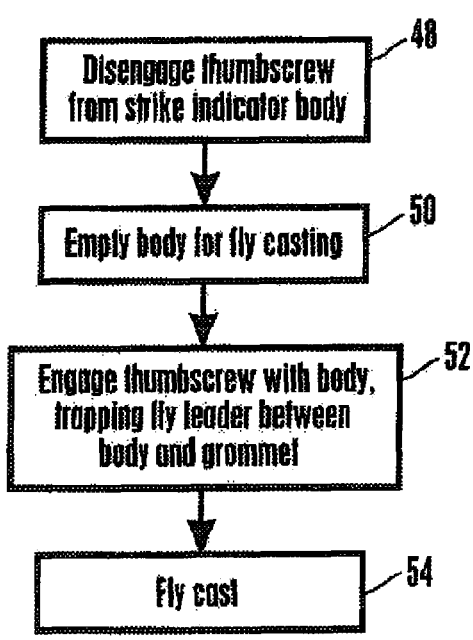
FIG. 5 is a flow chart illustrating the steps for using the strike indicator for fly fishing.

The operation of the structure shown in FIGS. 1-3 may be appreciated in reference to FIGS. 4 and 5. Commencing at block 40 in FIG. 4, the blocking element (e.g., the thumbscrew 22) is positioned to permit water to enter the body 14 to weight the body 14 for spin fishing. This may be done by grasping the flange 32, rotating the thumbscrew counterclockwise to remove it from the receptacle 18, and then submerging the body member 12 in water at block 42 to allow water to flow into the void 16 through the passageway 20.

At block 44 the thumbscrew is positioned in the receptacle 18 and rotated clockwise to the tightly engaged configuration, blocking the passageway 20 to prevent water from flowing out of the void 16 of the body 14 while trapping a fishing line 38. For spin fishing, the line 38 typically is the reel line of a spin cast fishing pole assembly, and is trapped between the body member 12 and grommet 34 to thereby hold the now-weighted body member 12 onto the fishing line 38. Spin cast fishing may then be conducted at block 46 with the weighted body member 12 advantageously providing ballast for longer casts while still retaining sufficient buoyancy to float on the water to act as a strike indicator.

The strike indicator 10 may also be configured for fly cast fishing using the process shown in FIG. 5. Starting at block 48, the blocking element is disengaged from the body member, the void 16 substantially emptied of water at block 50, and then the blocking element re-engaged with the body member at block 52 in the tightly engaged configuration with a fishing line 38 trapped between the blocking element and body member as discussed previously. Typically, for fly cast fishing the fishing line 38 used in FIG. 5 that is trapped between the body member and blocking element is the leader line of a fly cast fishing pole assembly. Fly cast fishing is then conducted at block 54 with the substantially unweighted strike indicator 10, with the weight of the fly line providing the necessary ballast for casting.

Accordingly, it may now be appreciated that a wide variety of fishing line diameters may be securely trapped between the movable thumbscrew and the spherical body of the strike indicator, holding the strike indicator on any one of a wide variety of fishing lines. It may also be appreciated that no special tooling or excessive manual dexterity is required to quickly and securely attach the strike indicator to the fishing line. Furthermore, the hollow spherical body can be weighted as appropriate for fly fishing and spin casting. Further still, the body with thumbscrew is balanced and aerodynamic during casting and advantageously floats screw down in the water to appropriately maintain the hook under the indicator.

FIGS. 6-9 show an alternate thumbscrew 122 that includes, on a proximal end of a threaded shank 124, a collar 126. The collar 126 defines the collar defines an inwardly-facing surface 128 in turn defining a plane. The collar 126 also defines an outwardly-facing surface 130 parallel to the plane defined by the inwardly-facing surface 128, with the parallel planes of the collar surfaces 128, 130 being orthogonal to the long axis of the shank 124.

Figure 6:
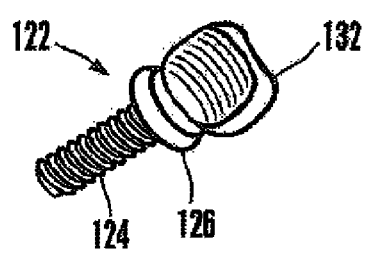
FIG. 6 is a perspective view of an alternate thumbscrew that can be used with the strike indicator body member of FIG. 1.

Completing the description of the thumbscrew 122, a manipulable preferably flat flange 132 extends away from the outwardly-facing surface 130 of the collar 126. As shown, the flange 132 defines a plane that is perpendicular to the plane defined by the inwardly-facing surface 128 of the collar 126. The flange 132 may be roughly heart-shaped as shown in FIGS. 6, 7, and 9 and as best shown in FIG. 9 may have a textured surface established by parallel ridges 134 to facilitate grasping of the flange 132 between a person's fingers to promote rotational manipulation of the thumbscrew 122.

Figure 7:
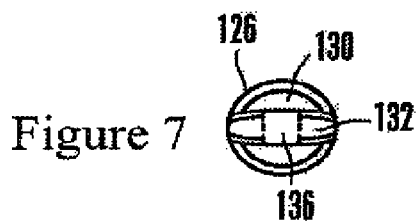
FIG. 7 is a top plan view of the thumbscrew shown in FIG. 6.
Figure 8:
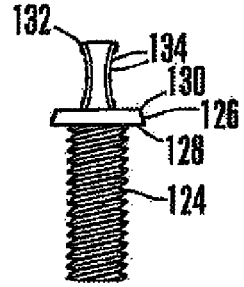
FIG. 8 is a side elevational view of the thumbscrew shown in FIG. 6.
Figure 9:
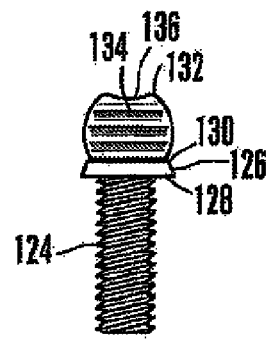
FIG. 9 is a front elevational view of the thumbscrew shown in FIG. 6.

In the example of FIGS. 6-9 and as best illustrated in FIGS. 8 and 9, the collar 126 is tapered outwardly in the axial dimension from the outwardly-facing surface 130 to the inwardly-facing surface 128, i.e., the inwardly-facing surface 128 is marginally larger than the outwardly-facing surface 130.

The heart shape of the flange 132 is established as best shown in FIGS. 7 and 9 by a generally disk-shaped body (in front elevation) that has a top concavity 136. However, while the example flange 132 has a generally disk-shaped body in front elevation that is heart-shaped in tote owing to the top concavity 136, as shown in the side elevation view of FIG. 8 the flange body is concave on both sides. In other words, the opposed major side surfaces of the flange 132 body, on which are formed the ridges 134, are concave, not flat, in the example non-limiting implementation shown in FIG. 8, to further promote grasping of the flange 132 by a person. The threads of the shank 124 may be #6-32.

While the particular VERSATILE FISHING STRIKE INDICATOR is herein shown and described in detail, it is to be understood that the subject matter which is encompassed by the present invention is limited only by the claims.

What is claimed is:

1. A fishing strike indicator, comprising:
    a hollow plastic body defining a spherical interior void and an outer surface, a passageway for fluid communication being formed into the interior void, the body being buoyant when the void is empty of water;
    a springless boss on the outer surface of the body and defining at least part of the passageway for fluid communication, no other boss being on the body, the boss being made unitarily with the body;
    a hollow grommet; and
    a screw made separately from the grommet and defining a threaded shank around which the grommet is disposed, the shank threadably engaging the boss to selectively block and unblock the passageway for fluid communication, no spring being interposed between the screw and boss, the screw further defining:
        a collar, the collar defining an inwardly-facing surface defining a plane and an outwardly-facing surface parallel to the plane defined by the inwardly-facing surface, the grommet being disposed against the inwardly-facing surface of the collar of the screw, wherein the screw is rotatable between a disengaged configuration, in which the passageway is open to permit fluid communication into and out of the interior void of the body, and a tightly engaged configuration, wherein the passageway is blocked and the grommet contacts a top surface of the boss to trap a fishing line between the grommet and the top surface of the boss in that the fishing line when trapped is sandwiched between the grommet and the top surface of the boss, lying against both the grommet and the top surface of the boss, the screw also defining:
        a manipulable flange extending away from the outwardly-facing surface of the collar and defining a plane perpendicular to the plane defined by the inwardly-facing surface of the collar.

2. The strike indicator of claim 1, wherein the body is made of polypropylene.

3. The strike indicator of claim 1, wherein the grommet is made of resilient plastic or rubber.

4. The strike indicator of claim 1, wherein the boss is internally threaded at least around the part of the passageway defined by the boss.

5. The strike indicator of claim 1, wherein the flange is generally heart-shaped.

6. A springless fishing appliance comprising:
    a hollow body member that is buoyant when no water is inside it;
    one and only one a passageway for fluid communication being formed through the body member to permit fluid to flow in and out of the body member through the passageway; and
    one and only one manually manipulable blocking element configured for selectively blocking the passageway and to trap a fishing line between the body member and the blocking element when the passageway is blocked by the blocking element, the blocking element including a shank threadably engaged with a portion of the body, the portion of the body being integral with the body and not detachable therefrom, no spring being disposed between the blocking element and the passageway for fluid communication, wherein
    the blocking element can be positioned to permit water to enter the body member to weight the body member for spin fishing, the element then being positionable to trap a fishing line between the blocking element and the body member and to substantially prevent water from exiting the body member, the blocking element being manipulable to unblock the passageway to permit the body member to be substantially emptied of water to make the body buoyant such that it establishes a strike indicator for fly fishing, the blocking element being positionable to block the passageway to prevent water from entering the substantially empty body member and to trap a fishing line between the blocking element and the body member.

7. The appliance of claim 6, wherein the portion of the body member with which the shank is engaged includes a hollow cylindrical blocking element receptacle, the body member further including a spherical body, the blocking element receptacle being formed integrally on the spherical body and extending radially away from a spherical surface of the spherical body.

8. The appliance of claim 7, wherein the shank is threaded and the receptacle defines a threaded passageway communicating with the interior of the body and configured for engaging the shank.

9. The appliance of claim 6, wherein the blocking element further comprises a grommet disposed around the shank.

10. The appliance of claim 9, comprising a collar circumscribing the shank, the collar defining an inwardly-facing surface defining a plane and an outwardly-facing surface parallel to the plane defined by the inwardly-facing surface, the grommet being disposed against the inwardly-facing surface of the collar.

11. The appliance of claim 10, the shank is movable between a disengaged configuration, in which the passageway is open to permit fluid communication into and out of the interior void of the body member, and a tightly engaged configuration, wherein the passageway is blocked and the grommet contacts a surface of the body member to trap a fishing line therebetween when the fishing line is disposed between the grommet and the body member.

12. The appliance of claim 11, comprising a manipulable flange extending away from the outwardly-facing surface of the collar and defining a plane perpendicular to the plane defined by the inwardly-facing surface of the collar.

* * * * *